Jan. 9, 1951   C. A. COBB, JR., ET AL   2,537,303
STERILIZABLE CAMERA CASING AND FOCUSING
MEANS FOR SURGICAL PHOTOGRAPHY
Filed Dec. 22, 1945
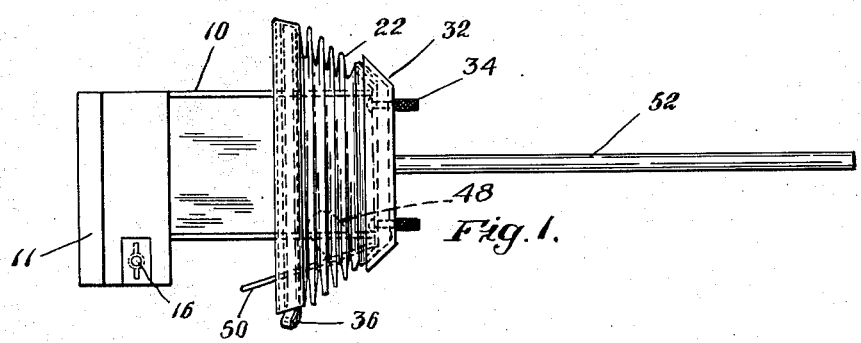
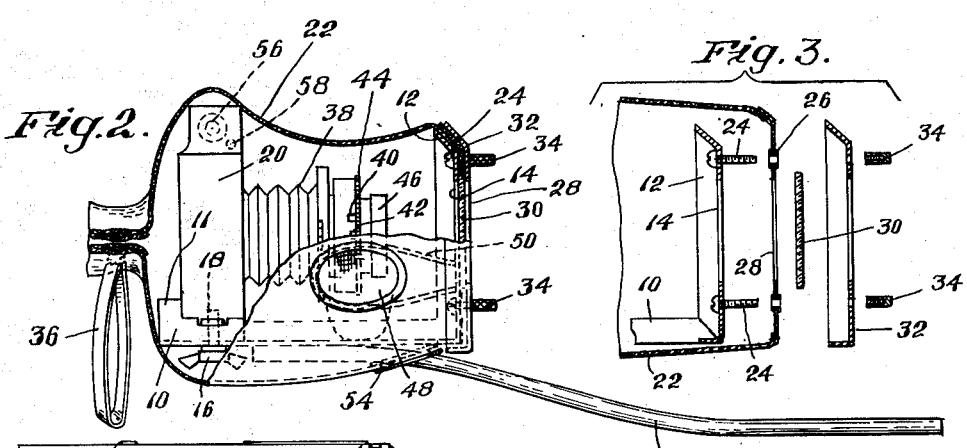
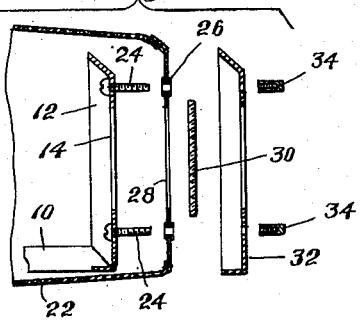
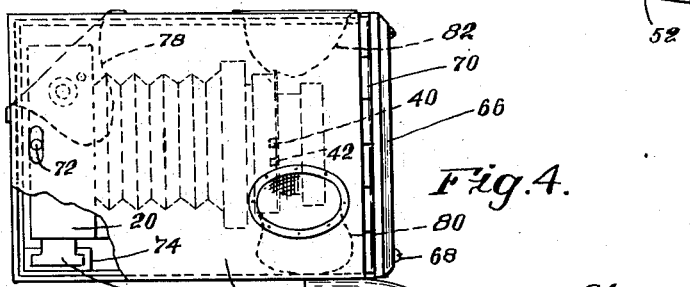
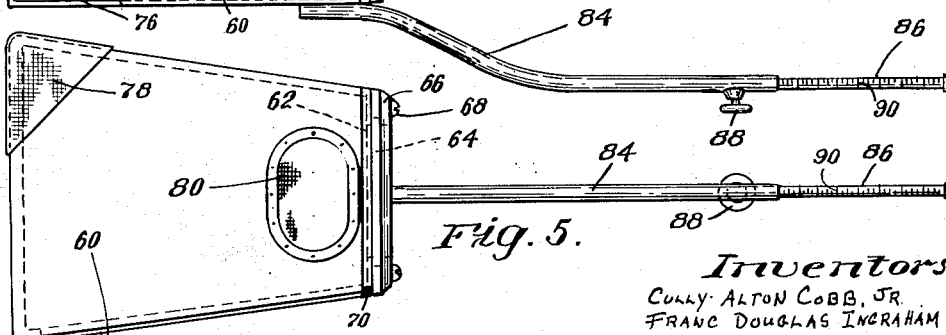
Inventors
CULLY ALTON COBB, JR.
FRANC DOUGLAS INGRAHAM
by Edgar H. Kent
Attorney Patented Jan. 9, 1951

2,537,303

UNITED STATES PATENT OFFICE 2,537,303

STERILIZABLE CAMERA CASING AND FOCUSING MEANS FOR SURGICAL PHOTOGRAPHY

Cully Alton Cobb, Jr., and Franc Douglas Ingraham, Brookline, Mass., assignors to The Children's Hospital, a corporation of Massachusetts Application December 22, 1945, Serial No. 636,850

3 Claims. (Cl. 95—11)

1

This invention relates to surgical photography and provides an apparatus and method by which a camera may be brought into the zone of a surgical operation and pictures of the operation taken at close range without danger of infecting the patient.

In surgery it is necessary to take the utmost precaution that any object brought into the zone of an operation be sterilized on all exposed surfaces—otherwise, there is serious danger that germs would be brought into the zone by the object and infect the wound. Since a camera is by nature a delicate instrument which cannot be effectively sterilized, photographing of operations at adequately close range has been prohibited by the risk that would be entailed in bringing a camera into the operating zone, and the benefits that would result from such a photographic record have been thus denied to the medical profession.

Our invention provides apparatus and method by which an unsterilized camera can be brought into the zone of a surgical operation and photographs made therewith at close range without danger of contaminating the zone or infecting the patient.

The apparatus of the invention comprises a portable casing or housing in which a camera may be removably mounted and which may then be tightly sealed about the camera. The casing is provided with a transparent window, in line with the camera lens, through which the picture is taken, and with means for focusing and operating the camera. The casing is so constructed as to be subject to sterilization, in the usual autoclave or in any convenient manner.

In practicing the method of the invention, the casing, after sterilization, is opened to receive the camera, the camera is mounted therein, and the casing is closed and sealed. This is accomplished outside the surgery zone without contacting the camera, which may be contaminated, with any exterior surface of the casing and while the casing is contacted and manipulated only by sterile surfaces. Thus, the casing may be held and manipulated by one individual whose hands, garments, etc. have been rendered sterile as in preparation for operation attendance and the camera may be placed and mounted therein by a second individual who is careful not to touch the exterior of the casing and so, possibly, to contaminate it in consequence of handling the nonsterile camera. The casing with contained camera is then carried into the operation zone on a sterile carrier or by sterile hands and the camera

2 is there operated to take the desired photographs while sealed within the sterile casing. The camera remains sealed within the casing throughout the time it is in the operating zone and is withdrawn from the casing outside that zone for replenishment of the film supply and re-sterilization of the casing.

Our invention will be further described with reference to the preferred forms of apparatus of the invention illustrated in the accompanying drawings, wherein:

Fig. 1 is a plan view of one form of apparatus with the casing opened to receive a camera;

Fig. 2 is a partial vertical section, partial side elevation view of the apparatus of Fig. 1 with the camera mounted and casing closed;

Fig. 3 is an exploded detail of a portion of the apparatus of Figs. 1 and 2; and Figs. 4 and 5 are, respectively, side elevation and plan views of a modified form of apparatus.

Referring to the accompanying drawings, the embodiment illustrated in Figs. 1 to 3 has a camera supporting base member 10 provided at the front end with an upstanding frame 12 apertured centrally at 14. The rearward end of base member 10 has threaded therethrough a wing bolt 16, the threaded end of which projects above the upper surface of the base and is received in a threaded opening 18 provided in the box or frame of a camera 20 to position and retain the camera on the base against a raised rib 11 on the rear end of the base, with the lens opening of the camera in line with aperture 14 in frame 12.

In this form of the apparatus, the casing is a bag 22 of flexible material such as canvas or other closely woven cloth, one end of which is fastened to frame 12 of base 10. As shown, bag 22 is removably fastened to frame 12 by means of screws 24 projecting forwardly from frame 12 and received through grommets 26 provided in the bag. Between the grommets 26, the bag is cut away at 28 to provide an opening co-extensive and registering with the opening 14 of frame 12. A sheet of glass or other transparent material 30 is clamped over the opening 28 by means of a frame member 32 having openings through which the screws 24 are received, frame 32 being pressed against the bag and frame 12 by means of caps 34 screw threaded on the outer ends of screws 24 and bearing on the frame 32.

The opposite end of bag 22 is provided with a draw string 36 by which the material at that end of the bag may be gathered to form a tight closure, as shown in Fig. 2, or opened up to substantially the full diameter of the bag to permit insertion and withdrawal of the camera. The bag is of sufficient length and diameter to enclose the entire frame 10 and assembled camera 20 as shown in Fig. 2.

The camera 20, indicated in Fig. 2, is of a conventional type in which the lens and shutter mechanisms are carried at the front of a collapsible support 38, the shutter lever being shown at 40 operable against a stop 42. Exposure time adjustment is made by turning a notched edge ring 44 about the lens opening against a scale visible from the front of the camera. A portrait lens 46 is removably mounted at the front of support 38. The camera 20, when mounted on base 10 against stop rib 11 by means of bolt 16 is positioned with its lenses and shutter opening aligned with and centered on the window formed by the aligned apertures in frames 12 and 32 and bag 22 and the transparent sheet 30 clamped between them.

For operating the shutter lever 40 when the camera is enclosed within the bag 22, a finger socket 48 is provided in the bag 22, this socket extending through a wire loop 50 projecting rearwardly from frame 12 beside the lever 40. Loop 50 holds the material of the bag away from the shutter lever to prevent accidental operation, while socket 48 permits intended operation by a finger inserted therein to press the lever through the flexible material of the socket.

Fixed approximately centrally to the under part of frame 10 and extending forwardly thereof is a bar 52, the bar, as shown, curving downwardly between its ends. Bar 52 provides a focusing device for the camera enclosed in the casing as will hereinafter be explained. Bar 52 extends through an aperture in the bag 22 provided with an elastic edge 54 which engages tightly about the bar.

The form of casing apparatus may be utilized according to the method of the invention for photography in a sterile surgery zone as follows. The casing device without the camera, as shown in Fig. 1, is sterilized as a unit, for example, in an autoclave. The device is then removed from the sterilizer by a first person, referred to as a "sterile" person, who touches it only with sterile surfaces. The device is held by this person with the bag 22 drawn back to expose base 10, as shown in Fig. 1, while a second person positions the camera 20 on the base 10 with the rear surface of the camera box against rib 11 and with the opening 18 overlying bolt 18, and fastens the bolt 18 into the aperture 20. This second person, referred to as "non-sterile" because of contamination by contact with the non-sterile camera, is careful neither to contact nor to permit the camera to contact any part of the casing device which is exposed when the bag 22 is closed.

Before application to the frame 10 the camera is loaded with a film which is unrolled for successive exposures by turning a knob 56 projecting from one side of the camera box. The adjustment mechanism operated by knob 56 is preferably provided with a locking means which automatically locks the mechanism against adjustment when the film is properly positioned for an exposure, the lock being releasable to permit adjustment of the film to a new exposure by pressing a release pin 58 located beside the knob 56. The camera is also adjusted prior to insertion in the containing device to focus properly an object or area at a predetermined distance which is ordinarily the known distance from the outer end of the focusing bar 52 to the focal point of the camera positioned in the enclosure device.

When the camera has been fastened on the base 10, the bag 22 is drawn rearwardly over the base 10 and camera 20 by the sterile person, and closed by means of the draw string 36. The camera is now enclosed within a casing, all exposed surfaces of which have been sterilized and have been contacted only with sterile surfaces. The device may therefore be carried into the surgery zone by a sterile person and there operated without danger of infecting the zone.

In taking pictures, the device is held with the tip of focusing bar 52 approximately in the plane of the area to be photographed and at one edge of the area, so that the area is aligned and approximately centered with the window of the device. The camera is thereby brought into proper focus upon the area, the focusing bar being arranged just outside the field of focus, and the camera is operated to take a picture thereof by inserting a finger into the socket 48 and pressing lever 40 against stop 42. For another exposure, pin 58 is pressed to release the lock and knob 56 is turned until it again locks, both these adjustments being made through the flexible substance of the bag. The shutter mechanism may then again be operated, and so on. If it is desired to change the time exposure, this adjustment can also be made on the contained camera by manipulating ring 44 through the flexible substance of the bag, the scale against which ring 44 operates being visible from the front of the camera through the window at the front of the device.

Figs. 4 and 5 of the drawing illustrate a modified form of the apparatus which may be employed according to the invention in similar manner to the device of Figs. 1 to 3. This form of device comprises a rigid box structure 60, the front wall of which is provided with a window aperture 62 against the rim of which a transparent sheet 64 is clamped by a frame 66 fastened by screws 68. One side wall of the box 60 is hinged at 70 to the front wall of the box, to form a door which is opened outwardly by means of a handle 72 to expose the interior of the box for insertion of a camera therein. The floor of the box is provided adjacent its rear edge with a keyway 74 which slidably receives a key 76 on the bottom edge of the box of the camera, this key, when fully inserted in the keyway, acting to hold the camera in proper position.

One corner of the box is cut away and closed by a flap 78 of flexible material forming a socket which extends down about the film adjustment means 56, 58 of the camera and permits their adjustment by the fingers acting through its flexible substance. The hinged side wall of the box has an opening near the front thereof which is closed by a flexible flap 80 extending inwardly of the wall and forming a finger socket, corresponding to the socket 48 of the device of Figs. 1 to 3, by which the shutter lever 40 may be manipulated. A similar flexible socket flap 82 is provided in the top wall of the box permitting adjustment therethrough of the time exposure control 44.

Fixed centrally to the bottom of the box 60 and projecting forwardly thereof is a focusing bar 84. Bar 84 differs from the bar 52 of the device of Figs. 1 to 3 in that its forward end is made hollow to receive slidably a rod 86 which may be telescoped into bar 84 and is held in any extended position by means of a set screw 88. Rod 86 is provided with a fractional inch or other linear measurement scale 90 graduated rearwardly from the front end of the rod so that the scale may be read against the end of bar 84 to show how far the bar extends beyond the rod.

Before insertion in the box, the camera may be adjusted to focus properly on an area spaced from its focal point a distance equal to the distance therefrom, when the camera is positioned in the box, of the tip of rod 86 fully extended from bar 84. When it is possible to place the tip of rod 86 in the plane of the area to be photographed, the rod is maintained fully extended. If, however, the area to be photographed is sunken with respect to the plane of the surrounding area which the rod contacts, as in photographing a deep incision, the rod is telescoped into bar 84 by an amount, as indicated by scale 90, equal to the actual or estimated depth of the area to be photographed below the surrounding plane of contact of the rod. By this adjustment, when the rod is brought into contact with a surface beside the area to be photographed, the camera is no longer focused for the plane of that surface but for the sunken plane of the area.

Rod 86 may also be employed in like manner to adjust the focus for areas raised with respect to the surrounding area of contact of the rod, provided the camera is first focused for the plane of the tip of the rod in a telescoped position, by adjusting the rod outwardly from that position.

The use of the adjustable form of focusing bar shown in Figs. 4 and 5 is particularly advisable for photographing the interior of incisions with a portrait lens, since such a lens has a focus range at any one setting of only about an inch toward and from the camera.

As in the case of the apparatus of Figs. 1 to 3, the device of Figs. 4 and 5 is employed according to the method of the invention by first sterilizing the device without the camera, then inserting the camera therein while the exterior of the device is contacted only by sterile surfaces. Thus, the device may be held and the door opened and closed by a sterile person while the camera is inserted therein by a second person without contacting the outer surfaces of the device. The camera is operated in the surgical zone in the manner described with reference to the embodiment of Figs. 1 to 3, the flexible sockets affording means for manipulating the operating parts from the exterior of the device, the container completely insulating the camera to prevent contamination of the operation zone thereby.

In case a camera is employed where vision, not afforded by the front window, is requisite to proper adjustment or manipulation of the camera within the enclosure, sight windows may be provided at suitable positions in the box or bag in either form of apparatus.

It will be understood that the specific embodiments of apparatus and practice of the process of the invention hereinabove described are preferred only and that changes may be made therein within the spirit and scope of the invention.

We claim:

1. In a surgical photographic device comprising a camera and a sterilizable casing for the camera having a window therein, the casing being arranged to be opened up to receive the camera in the interior thereof and to be closed about the camera and including a support on which the camera is adapted to be removably mounted with the lens opening aligned with said window, a sterilizable focusing bar associated with said casing and extending forwardly of said window, said bar including a first portion adjacent the casing forming an obtuse angle with a line drawn perpendicular to the principal axis of said window and a second portion in a plane substantially paralleling the plane of said axis, and a socket in said casing formed of a flexible material through which the shutter-operating mechanism of the camera may be actuated.

2. A device according to claim 1 further characterized in that the portion of said sterilizable bar lying in a plane generally paralleling the plane of the principal axis of said window has an extension piece associated therewith in slidable telescopic relation.

3. A device according to claim 1 in which the camera comprises film adjustment means and the casing is provided with a second socket formed of a flexible material through which said means are manipulated.

CULLY ALTON COBB, Jr.
FRANC DOUGLAS INGRAHAM.

REFERENCES CITED

The following references are of record in the file of this patent:

UNITED STATES PATENTS

| Number | Name | Date |
|---|---|---|
| 1,122,104 | Gruen | Dec. 22, 1914 |
| 1,535,312 | Hosking | Apr. 28, 1925 |
| 1,589,436 | Seebold | June 22, 1926 |
| 1,701,315 | Sterick | Feb. 5, 1929 |
| 1,960,722 | Alderman | May 22, 1934 |
| 2,185,508 | Kunze | Jan. 2, 1940 |
| 2,206,032 | Foster | July 2, 1940 |
| 2,239,379 | Bucky | Apr. 22, 1941 |
| 2,333,778 | Green et al. | Nov. 9, 1943 |
| 2,403,892 | McFarlane et al. | July 9, 1946 |
| 2,431,825 | Pollock | Dec. 2, 1947 |

FOREIGN PATENTS

| Number | Country | Date |
|---|---|---|
| 423,746 | Germany | Jan. 8, 1926 |

OTHER REFERENCES

Davis: "Underwater Photography," article in "The Camera," February 1937, published in Philadelphia, Pa.